US006941028B2

(12) United States Patent
Kimmel et al.

(10) Patent No.: US 6,941,028 B2
(45) Date of Patent: Sep. 6, 2005

(54) SYSTEM AND METHOD FOR IMAGE ENHANCEMENT, DYNAMIC RANGE COMPENSATION AND ILLUMINATION CORRECTION

(75) Inventors: Ronny Kimmel, Haifa (IL); Michael Elad, Haifa (IL); Doron Shaked, Haifa (IL); Renato Keshet, Haifa (IL); Irwin Sobel, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 570 days.

(21) Appl. No.: 09/843,834

(22) Filed: Apr. 30, 2001

(65) Prior Publication Data

US 2003/0012448 A1 Jan. 16, 2003

(51) Int. Cl.[7] ................................. G06K 9/40
(52) U.S. Cl. ...................... 382/274; 382/299
(58) Field of Search ............................ 382/274, 254, 382/299, 300, 162, 167; 358/509, 518, 519, 521, 525

(56) References Cited

U.S. PATENT DOCUMENTS

| 4,384,336 | A | | 5/1983 | Frankle et al. |
| 4,649,568 | A | | 3/1987 | Kiesel et al. |
| 4,750,211 | A | | 6/1988 | Wray |
| 4,839,721 | A | * | 6/1989 | Abdulwahab et al. ...... 358/518 |
| 5,991,456 | A | | 11/1999 | Rahman et al. |
| 6,038,339 | A | * | 3/2000 | Hubel et al. ................. 382/162 |
| 6,304,294 | B1 | * | 10/2001 | Tao et al. .................... 348/370 |

OTHER PUBLICATIONS

R. Kimmel et al: "A Variational Framework for Retinex" HP Technical Report 1999–151. Jun. 1999 pp. 1–30 XP02243109.

* cited by examiner

*Primary Examiner*—Yon J. Couso (57) ABSTRACT

A system and a method solve the estimation problem of finding reflectance R and illumination L. The system and method to solve a functional of the unknown illumination L such that a minimum of the functional is assumed to yield a good estimate of the illumination L. Having a good estimate of the illumination L implies a good estimate of the reflectance R. The functional uses a variational framework to express requirements for the optimal solution. The requirements include: 1) that the illumination L is spatially smooth; 2) that the reflectance values are in the interval [0,1] —thus, when decomposing the image S, the solution should satisfy the constraint L>S; 3) that among all possible solutions, the estimate of the illumination L should be as close as possible to the image S, so that the contrast of the obtained R is maximal; and 4) that the reflectance R complies with typical natural image behavior (e.g., the reflectance is piece-wise smooth).

19 Claims, 9 Drawing Sheets

SYSTEM AND METHOD FOR IMAGE ENHANCEMENT, DYNAMIC RANGE COMPENSATION AND ILLUMINATION CORRECTION

TECHNICAL FIELD

The technical field is enhancement of digital images.

BACKGROUND

The human visual system is typically able to adapt to lighting variations across scenes, perceiving details in regions with very different dynamic ranges. Most image recording systems, however, fail this dynamic range compression task. As a result, images produced by these image recording systems are often of poor quality, compared to images produced by human perception. Another task that is often poorly performed by the image recording systems is that of color constancy. Humans perceive color in a way that is fairly independent of scene illumination, whereas the image recording systems are strongly influenced by spectral shifts.

The above problems can be stated mathematically by describing a relationship between an acquired image S, a reflectance of objects of the image R, and an illumination L in a pixel-wise multiplication, or:

$$S = L \cdot R.$$

This expression means that at each point in the image S, the color value is the multiplication of the reflectance value by the illumination value. Given an image S, the problem to be solved is removal of the effects of illumination and recovery of the reflectance image. That is, given S, find both R and L. However, calculation of both R and L is typically not possible. The solution then, is to generate a methodology that can estimate R and L.

Retinex theory deals with compensation for illumination in images. The goal of the Retinex theory is to decompose a given image S into the reflectance image R, and the illumination image L, such that at each point (x,y) in the image domain, S(x,y) equals the product of R(x,y) and L(x,y). The benefits of such decomposition include the possibility of removing illumination effects of back/front lighting, enhancing photographs and other image capture methods that include spatially varying illumination, such as images that contain indoor and outdoor zones, and correcting colors in images by removing illumination-induced color shifts.

As noted above, recovering the illumination L from a given image S is known to be a mathematically ill-posed problem, and known algorithms vary in the manner and effectiveness of overcoming this limitation. The Retinex approach provides the framework for one such method. The Retinex methodology was motivated by Edward Land's research of the human visual system, which is described in R. H. Land, "The Retinex Theory of Color Vision," *Sci. Amer.*, Vol. 237, pp. 108–128 (1977).

The first Retinex algorithms were of the random walk type. Subsequent Retinex algorithms used homomorphic filtering. Yet another group of Retinex algorithms are based on solving a Poisson equation.

Figure 1:
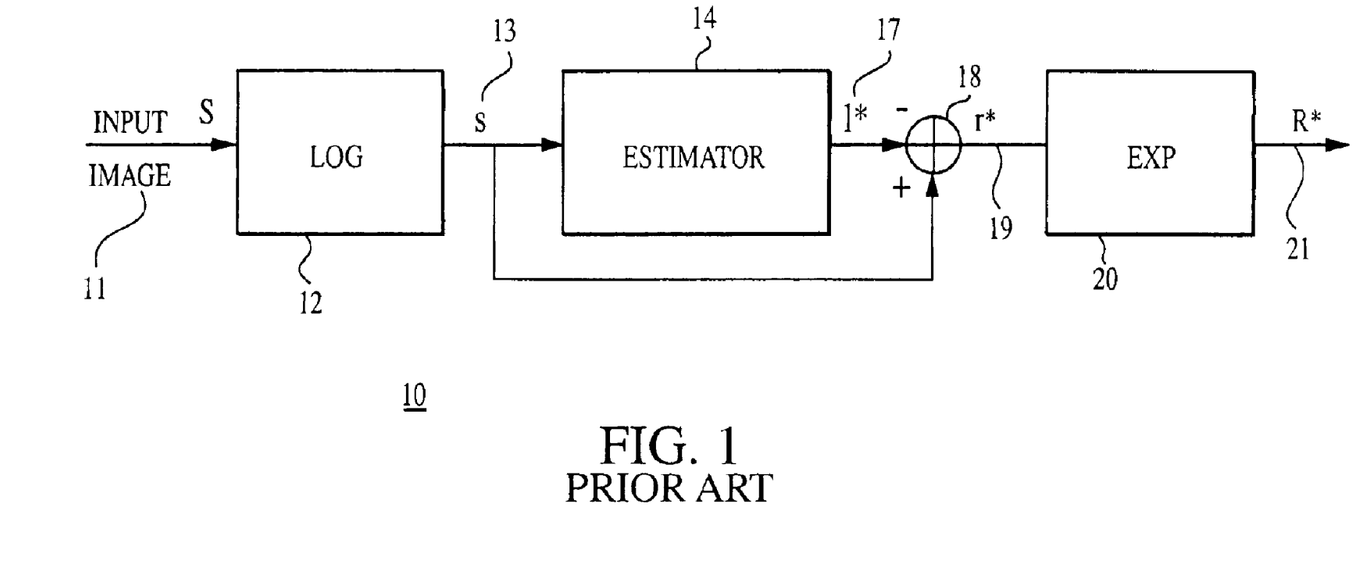
FIG. 1 is a diagram of a prior art algorithm for estimating illumination.

FIG. 1 is a block diagram of an algorithm 10 that is representative of the general class of prior-art Retinex algorithms. In FIG. 1, an input image S 11 is applied to a logarithmetic module 12 to produce a logarithmetic version 13 of the input image S and its two components, illumination L and reflectance R. That is, s=log S, l=log L, and r=log R, and thereby, s=l+r. Using the logarithmetic version 13 of the input images, an estimator module 14 computes an estimate 17 of the illumination, designated in FIG. 1 as l*. The estimate 17 (l*) is then combined with the logarithmetic version 13 (s) at summer 18 to produce an estimate 19 of the reflectance (designated r*). Finally, the estimate 19 (r*) is converted from a logarithm to a number (antilogarithm) corresponding to the logarithm at expander 20, to produce a real number value as an estimate 21 of the reflectance (designated as R*). Prior art Retinex algorithms usually employ the same process as shown in FIG. 1.

The Retinex-based algorithms take several different forms. One such form is the random walk algorithm, which is a discrete time random process in which the "next pixel position" is chosen randomly from neighbors of the current pixel position. Random walk type Retinex algorithms are variants of the following basic formulation: A large number of walkers are initiated at random locations of the logarithmetic version 13 (s), adopting a gray-value of their initial position. An accumulator image A that has the same size as s is initialized to zero. As a walker walks around, the walker updates A by adding the value of the walker to each position (x,y) that the walker visits. The illumination image is obtained by normalizing the accumulator image A, i.e., the value at each position of the accumulator image A is divided by the number of walkers that visited that position.

By using many walkers with long paths, one can easily verify that the accumulator value at each position converges to a Gaussian average of that position's neighbors.

Another type of Retinex algorithm uses homomorphic filtering, where a low-pass filter is used to reconstruct l from s. Homomorphic Retinex algorithms are based on the fact that the reflectance image R corresponds to the sharp details in the image (i.e., the edges), whereas the illumination L is expected to be spatially smooth. Then, a reasonable guess for l is l*=LP{s}, where LP is a convolution with a wide Gaussian kernel. Thus, the Retinex algorithm using homomorphic filtering actually applies the same process as the random walk algorithms by a single direct convolution.

Since the illumination L is expected to be spatially smooth, the derivative of the illumination L should be close to zero. However, considering the assumption that the reflectance R is piece-wise constant, the derivative of the reflectance R should vanish almost everywhere, with high values along edges of an image. Taking the derivative of the sum s=l+r and clipping out high derivative peaks, implies that the clipped derivative signal corresponds only to the illumination L. Poisson equation-type Retinex algorithms that rely on the Mondrian world model, use the above assumptions on the reflectance R as a piece-wise constant image. Applying the Laplacian, and the following clipping operation:

$\tau(\Delta s) = \Delta s$ where $|\Delta s| < \tau$ $\tau(\Delta s) = 0$ otherwise, yields the following Poisson equation $\Delta l^* = \tau(\Delta s)$ A solution to the Poisson equation may involve an iterative procedure that effectively inverts the Laplacian operator. Improvements to the method involve extracting discontinuities from the image gradient magnitude instead of the Laplacian to provide better boundary conditions.

One solution involves use of an iterative algorithm having a "reset" non-linearity that enforces the constraint $l \geq s$. The algorithm performs the interactive procedure.

$$l_{n+1}^* = \max\left\{\frac{l_n^* + s}{2}, \frac{l_n^* + D_n[l_n^*]}{2}\right\}$$

where $D_n$ is a translation operator, shifting the image s by the $n^{th}$ element of a sequence of spirally decaying translation vectors. Removing the max operation yields a simplified version $$l_{n+1}^* = \frac{l_n^* + D_n[l_n^*]}{2}$$

The above equation is a simple averaging operation that smoothes the images. The non-linear (max) operation forces the illumination image l to satisfy the constraint $l^* \geq s$.

Despite use of these algorithms, current image recoding and image enhancement systems and methods cannot produce images that are of sufficient quality to be comparable to images as perceived by the human vision system. Thus, an improved method and system are required to better remove illumination effects and to recover the reflectance image.

SUMMARY

A system and a method solve the estimation problem of finding reflectance R and illumination L. The system and method use a functional of the unknown illumination L such that a minimum of the functional is assumed to yield a good estimate of the illumination L. Having a good estimate of the illumination L implies a good estimate of the reflectance R.

The functional uses a variational framework to express requirements for the optimal solution. The requirements include: 1) that the illumination L is spatially smooth; 2) that the reflectance values are in the interval [0,1]—thus, when decomposing the image S, the solution should satisfy the constraint L>S; 3) that among all possible solutions, the estimate of the illumination L should be as close as possible to the image S, so that the contrast of the obtained R is maximal; and 4) that the reflectance R complies with typical natural image behavior (e.g., the reflectance is piece-wise smooth).

The four requirements lead to a well-behaved optimization problem having quadratic programming, which is convex, with a single solution. The method and the system use a numerical algorithm for the solution, where the algorithm is based on a multi-resolution decomposition of the image S.

The method and the system are adaptable to different image situations. In a first situation, given a color image in the RGB color-space, applying the algorithm on the three color channels separately produces color correction. An alternative embodiment involves converting the input image S into a chromatic-luminance color space. The algorithm is then applied to the luminance alone, resulting in an image that preserves the input colors, and improves the local contrast.

Figure 9:
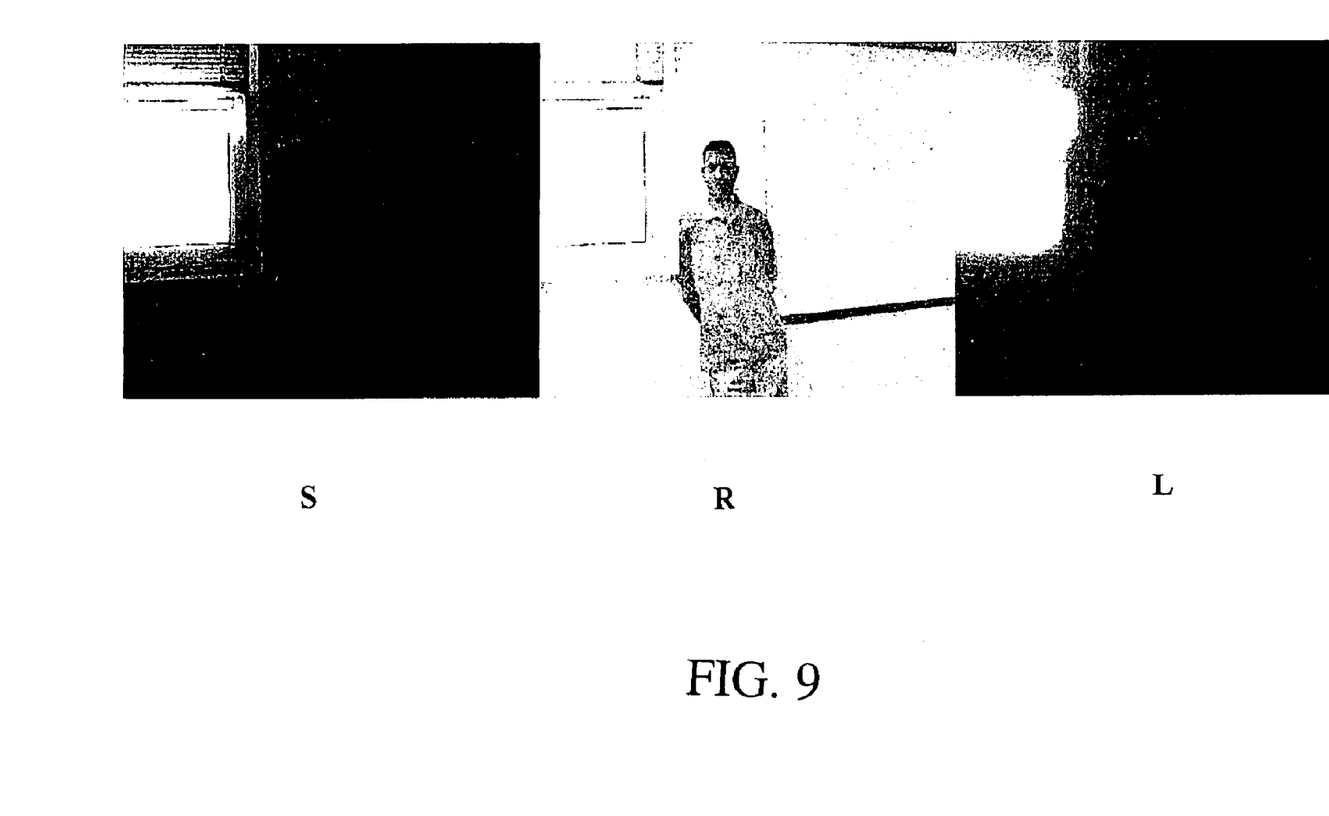
FIG. 9 is an image triplet showing the effects of illumination on an image.

A second situation accounts for the fact that although the illumination L is assumed to be spatially smooth on a global level, the assumption is sometimes wrong. This situation is shown dramatically in FIG. 9, where the illumination L is expected to have a sharp edge on the window boundaries. In situations such as that shown by the example of FIG. 9, allowing the illumination L to include sharp edges may be enabled by forcing piece-wise smoothness on the illumination L, rather than assuming global smoothness.

A third situation does not use the assumption of piece-wise smoothness for the reflectance R. Instead, a better quality prior image S is used. The better prior S allows use of multi-resolution and unisotropic considerations.

A fourth and final situation accounts for the fact that some illumination effect is needed in order to give the human user a natural feel of the recorded image. Thus, the method and the system may include a process that partially returns the illumination such that a final output image includes some illumination, but with improved contrast.

Using the four requirements enumerated above, the variational framework and the algorithm provide a novel solution to the problem of estimating illumination. The variational framework and the algorithm may be applied in many image recording situations, including in digital cameras as an automatic illumination compensation module, aimed at improving image reproduction quality, and in scanners and printers, as a special effect that improves the visual quality of a scanned/printed image.

DESCRIPTION OF THE DRAWINGS

The detailed description will refer to the following drawings, in which like numbers refer to like objects, and in which.

DETAILED DESCRIPTION

The human visual system is typically able to adapt to lighting variations across scenes (for example, shadows, strong illumination source), perceiving details in regions with very different dynamic ranges. Most image recording systems (e.g., cameras), however, fail this dynamic range compression task. As a result, images produced by these image recording systems are often of poor quality, compared to images produced by human perception. Another task that is often poorly performed by the image recording systems is that of color constancy. Humans perceive color in a way that is fairly independent of scene illumination, whereas the images recording systems are strongly influenced by spectral shifts.

The above problems can be mathematically formulated by describing a relationship between an acquired image S, a reflectance R of objects of the image, and an illumination L in a pixel-wise multiplication, or:

$$S = L \cdot R.$$

This expression means that at each point in the image S, the color value is the multiplication of the reflectance value by the illumination value. The effect of this relationship can be seen by a simple experiment. A person or other object in a room is placed near a window (or other light source) during daylight such that a strong light source (i.e., bright daylight) illuminates part of an image S to be recorded. Thus, the illumination is strong through the window and weak inside the room. A photograph is then taken, and the recorded image S is decomposed into reflectance R and illumination L. The person can barely be seen in the image S and the illumination L, but can be seen in the reflectance R.

Given an image S, the problem to be solved is removal of the effects of illumination and recovery of the reflectance image. That is, given S, find both R and L. However, calculation of either R or L is typically not possible. The solution then, is to generate a methodology that can estimate R and L.

Figure 2:
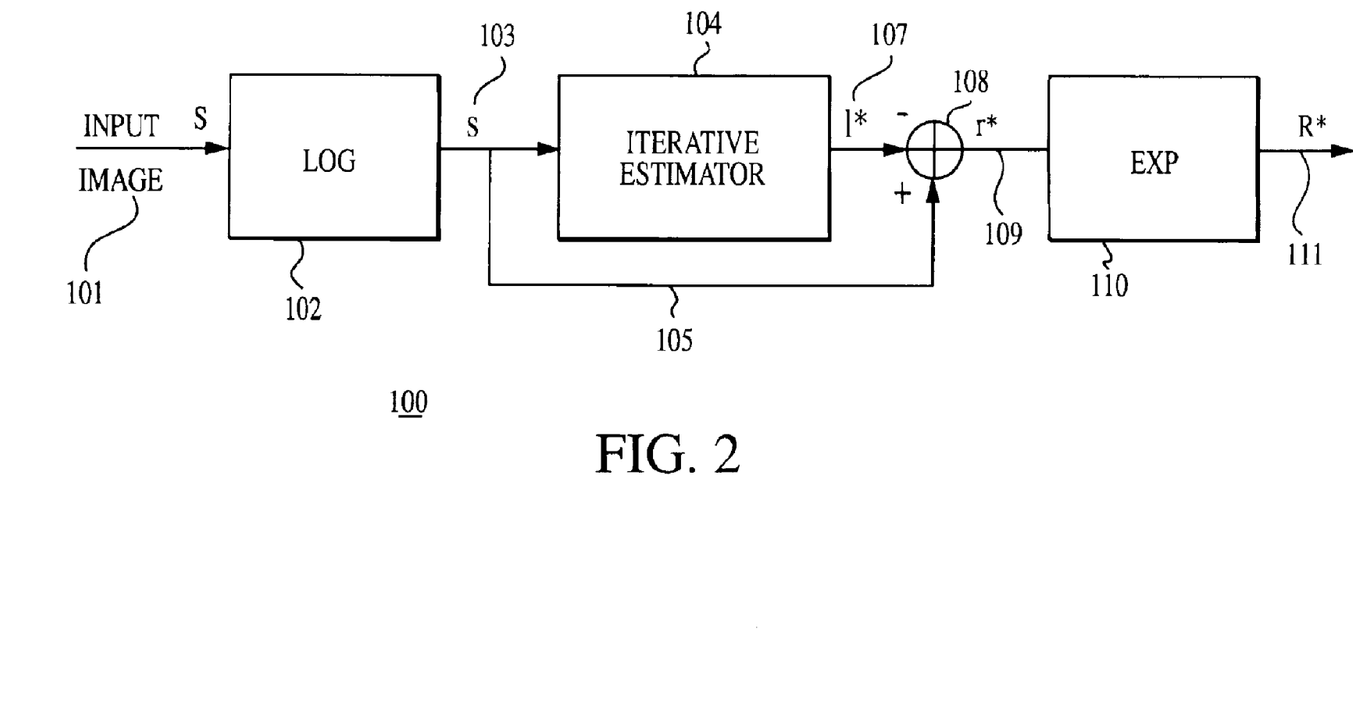
FIG. 2 is a block diagram of an improved algorithm for decomposing an image.

FIG. 2 is a block diagram of an improved algorithm 100 that may be used to estimate the illumination L and the reflectance R. In FIG. 2, an image S 101 is input to a logarithm module 102 to produce a logarithm s 103 of the image S 101 and its two components, illumination L and reflectance R. That is, s=log S, l=log L, and r=log R, and thereby, s=l+r. Using the logarithm s 103, an image processing module 104 uses a Projected Normal Steepest Descent or similar algorithm, with multi-resolution processing, to compute an estimate 107 of the illumination, designated in FIG. 2 as l*. The estimate 107 (l*) is then combined with the output 103 (s) at summer 108 to produce an estimate 109 of the reflectance (designated r*). Finally, the estimate 109 (r*) is converted from a logarithm to its corresponding base number value at exponential module 110, to produce a number value as an estimate 111 of the reflectance (designated as R*).

Figure 3:
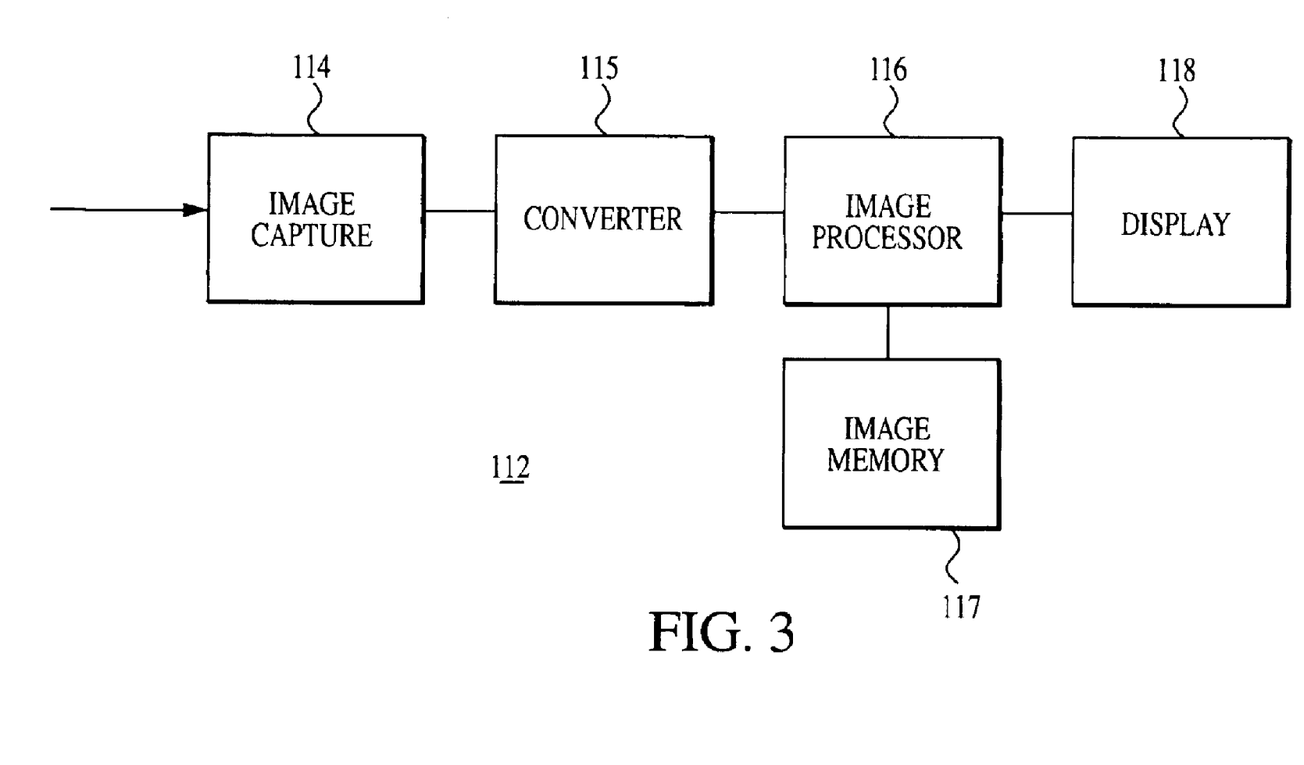
FIG. 3 is a diagram of a system that uses the improved algorithm of FIG. 2.

FIG. 3 is a block diagram of a representative component (a digital camera) 112 that uses the system and the method described herein. The component 112 includes an image capture device 114 that captures an image. The image capture device may include lenses, a CCD array, and other sub-components. An image converter 115 may be an optional subcomponent used for pre-processing of the captured image. An image processor 116 may include the necessary processing software and algorithms to enhance the captured image according to the methods and systems described herein. The component 112 may include an image memory 117 that stores captured images, both before and after processing by the image processor 116. Finally, a display device 118, which may be a liquid crystal display device, for example, provides a visual display for a user of the component 112.

To arrive at the solution to the problem of estimating R and L, a method and a system for applying the method begins by formulating the estimation problem of finding R and L from S as an optimization problem. That is, a functional of one of the unknowns (either L or R) is provided such that a minimum of the functional yields the desired result. The formulation uses a variational framework to express requirements from the optimal solution. The framework embodies the following requirements:

1. The illumination L is spatially smooth.
2. The reflectance R is restricted to the unit interval, which adds the constraint L≧S. Since the log function is monotone, l≧s.
3. Setting l=Const, where Const is any constant above the maximal value of s, yields a trivial solution that satisfies the two previous requirements. Thus, a requirement is added such that the illumination image l is close to the intensity image s, i.e., the value of l minimizes a penalty term of the form dist (l,s), e.g., the $L_2$ norm $(l-s)^2$.
4. The reflectance image s=l−r can be assumed to have a high prior probability. One of the simplest prior functions used for natural images assigns high probability to spatially smooth images.
5. The illumination continues smoothly as a constant beyond the image boundaries. This is an artificial assumption required for boundary conditions that would have minor effect on the final results.

Collecting all the above requirements into one expression yields the following penalty functional:

Minimize: (1)

$$F[l] = \int_\Omega (|\nabla l|^2 + \alpha(l-s)^2 + \beta |\nabla(l-s)|^2) \, dxdy$$

Subject to: l≧s and $<\nabla l, \vec{n}> = 0$ on $\partial\Omega$, (1)

where $\Omega$ is the support of the image, $\partial\Omega$ is the image boundary, and $\vec{n}$ is the normal to the boundary. $\alpha$ and $\beta$ are free non-negative real parameters. In the functional F[l], the first penalty term ($|\nabla l|^2$) forces spatial smoothness on the illumination image. This choice of smoothness penalty is natural, keeping in mind that minimizing $\int(|\nabla l|^2)dxdy$ translates into the Euler-Lagrange (EL) equation $\Delta l=0$. The steepest descent solution to the first penalty term is a Gaussian smoothing operation with increasing variance of the initial condition. As mentioned in the previous section, several authors proposed Gaussian smoothing of s for the illumination reconstruction.

The second penalty term $(l-s)^2$ forces a proximity between l and s. The difference between these images is exactly r, which means that the norm of r should be small (i.e., R tends to white). This term is weighted by the free parameter α. The main objective of this term is a regularization of the problem that makes the second penalty term better conditioned. Notice that, in addition, the solution l is forced to be l≧s.

The third penalty term is motivated by the Bayesian prior probability theory and encourages the reflectance image r to be a "visually pleasing image." In practice, this prior probability expression forces r to be spatially smooth. The third penalty term is weighted by the free parameter β. More complicated Bayesian expressions may be used allowing sharp edges, textures, 1/fbehavior, etc. As long as this expression is purely quadratic, the above minimization problem remains fairly simple.

The above-defined problem has a Quadratic Programming (QP) form. The necessary and sufficient conditions for the minimization problem are obtained with the Euler-Lagrange equations:

$$\forall (x, y) \in \Omega \left\{ \begin{array}{l} \frac{\partial F[l]}{\partial l} = 0 = -\Delta l + \alpha(l-s) - \beta \Delta(l-s) \\ \text{and } l > s \text{ or } l = s \end{array} \right\} \quad (2)$$

The differential equation does not have to hold when l=s.

The minimization problem is QP with respect to the unknown image l. A Projected Normalized Steepest Descent (PNSD) algorithm, accelerated by a multi-resolution technique, is used to solve this minimization problem.

The PNSD algorithm requires the application of a Normalized Steepest Descent (NSD) iteration that minimizes the functional F[l], followed by a projection onto the constraints. A NSD iteration has the format:

$$l_j = l_{j-1} - \mu_{NSD} G$$

where $l_j$ and $l_{j-1}$ are the illumination images at step j and j−1, respectively, G is the gradient of F[l], and $\mu_{NSD}$ is the optimal line-search step size. For Equation (2), the gradient of F[l] is given by:

$$G = \nabla l_{j-1} + (\alpha - \beta \Delta)(l_{j-1} - s),$$

and $\mu_{NSD}$ is given by:

$$\mu_{NSD} = \frac{\int |G|^2}{\int (\alpha |G|^2 + (1+\beta)|\nabla G|^2)}$$

Using integration by parts, $\int |\nabla G|^2 = -\int G \Delta G$ up to the boundary conditions.

An alternative approach is the Steepest Descent (SD) algorithm, where $\mu_{NSD}$ is replaced by a constant value $\mu_{SD}$, such that:

$$\mu_{SD} \in \left( 0, \frac{2}{\lambda_{max}\{-(1+\beta)\Delta + \alpha I\}} \right)$$

where $\lambda_{max}\{A\}$ refers to the greatest eigenvalue of the linear operator A. This alternative method saves computations at the expense of a slightly slower convergence.

Finally, projecting onto the constraint l≧s is done by $l_j = \max(l_j, s)$. In practice, G can be calculated by:

$$G = G_A + \alpha(l_{j-1} - s) - \beta(G_A - G_B)$$

where $$G_A \stackrel{\Delta}{=} \Delta l_{j-1},$$
$$G_B \stackrel{\Delta}{=} \Delta s_k$$

Similarly, $\mu_{NSD}$ is given by:

$$\mu_{NSD} = \frac{\mu_A}{\alpha \mu_A + (1+\beta)\mu_B},$$

where $$\mu_A \stackrel{\Delta}{=} \int |G|^2,$$
$$\mu_A \stackrel{\Delta}{=} \int |\nabla|^2.$$

The Laplacian may be approximated by a linear convolution with the kernel $k_{LAP}$ $$K_{LAP} = \begin{bmatrix} 0 & 1 & 0 \\ 1 & -4 & 1 \\ 0 & 1 & 0 \end{bmatrix},$$

and the integrations are approximated by summations:

$$\int |G|^2 \approx \sum_n \sum_m G[n, m]^2$$

$$\int |\nabla G|^2 = -\int G \Delta G$$

$$\approx -\sum_n \sum_m G[n, m](G * K_{LAP})[n, m]$$

where G[m, n]=G(mΔx, nΔy). In order to accommodate the boundary conditions, as given in Equation (1), the above convolution is applied on an expanded version of the image G. The extension is done by replicating the first and last columns and rows. After convolution, the additional rows and columns are removed.

Although simple, the PNSD algorithm usually converges slowly. Instead of general acceleration schemes, the fact that the unknown image l is assumed to be smooth may be used. Specifically, the method applies a multi-resolution algorithm that starts by estimating a coarse resolution image l, expands the resolution image l by interpolation, and uses the result as an initialization for the next resolution layer. This way, only a few iterations at each resolution are required for convergence.

Figure 4:
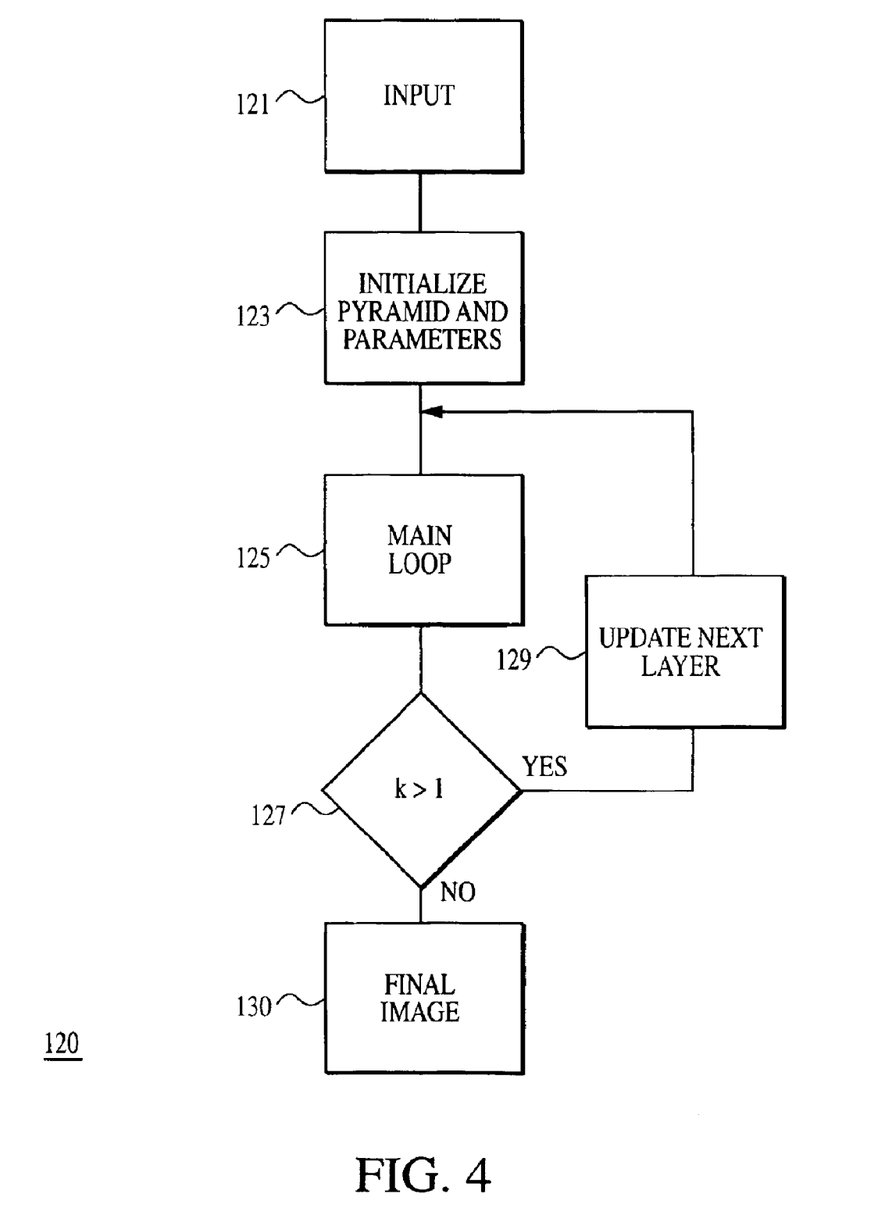
FIG. 4 is a flowchart showing a process according to the algorithm of FIG. 2.

Summarizing the above, a block diagram of an algorithm 120 for the solution of Equation (1) is shown in FIG. 4. The algorithm 120 begins with input block 121, where an input to the algorithm 120 is an image s of size [N, M], and the two parameters α and β.

In initialization block 123, a Gaussian pyramid of the image s is computed. The thus-constructed pyramid contains p resolution layers (from fine (1) to coarse (p)) with the current resolution layer (k) set to p. In block 125, $T_k$ iterations of the PNSD algorithm are applied to the kth resolution layer, until all resolution layers are checked, block 127. In block 129, the next resolution layer is updated. When all resolution layers are processed, the result is the final output of the algorithm 120.

Figure 5:
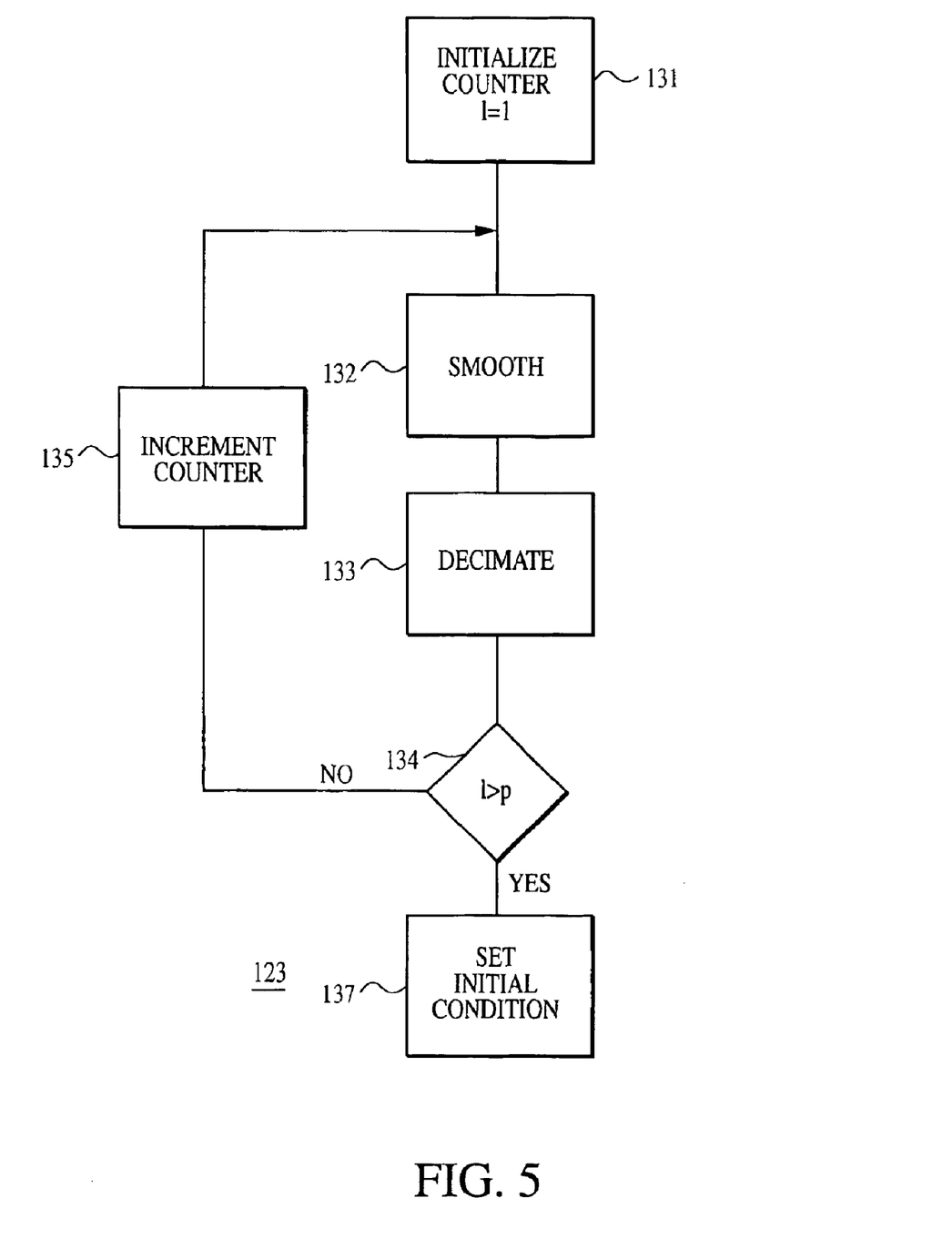
FIG. 5 is a flowchart of a sub-routine of the process of FIG. 4.

FIG. 5 is a block diagram showing the initialization routine 123 in more detail. In block 131, a counter is initialized with l=1. In block 132, the Gaussian pyramid is constructed by smoothing the image with a kernel, such as the kernel $k_{PYR}$:

$$K_{PYR} = \begin{bmatrix} \frac{1}{16} & \frac{1}{8} & \frac{1}{16} \\ \frac{1}{8} & \frac{1}{4} & \frac{1}{8} \\ \frac{1}{16} & \frac{1}{8} & \frac{1}{16} \end{bmatrix}$$

In block 133, the image is decimated by, for example, a 2:1 ratio. The process is repeated (block 134) and the counter is incremented (block 135) p times where for this section $p<1g_2$ (min (M, N)). This process produces a sequence of images $$\{s_k\}_{k=1}^p$$

conventionally named the "Gaussian Pyramid of s." The image $s_l$ is the original image s, and $s_p$ is an image with the coarsest resolution for the Gaussian pyramid.

In block 137, the process sets k=p, i.e., starts at the coarsest resolution layer k, and sets the initial condition $l_0 = \max\{s_p\}$.

Figure 6:
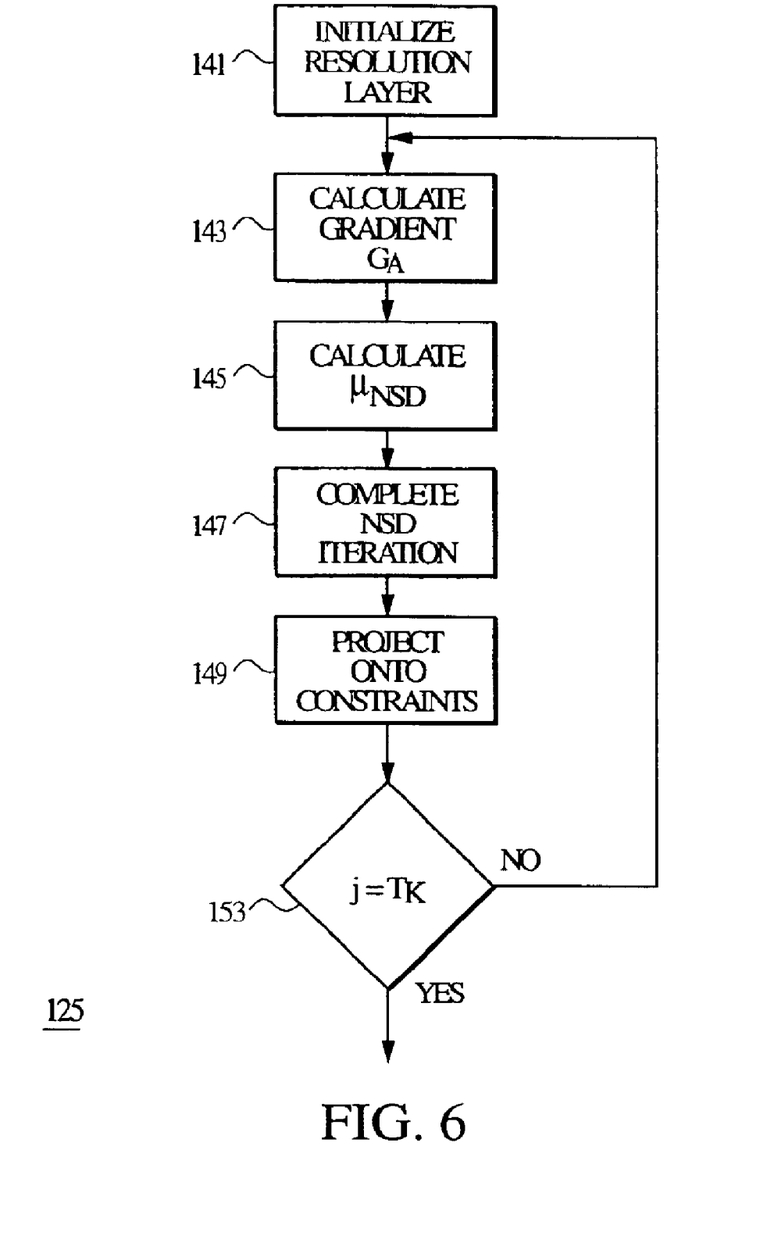
FIG. 6 is a flowchart of a further sub-routine of FIG. 4.

FIG. 6 is a block diagram of the PNSD processing main routine 125. The routine 125 starts at block 141, where for the $k^{th}$ resolution layer, the routine 125 calculates:

$$G_B = \Delta_k s_k$$

Where: $\Delta_k = \zeta * k_{LAP} 2^{-2(k-1)}$; namely a convolution of $\zeta$ with the kernel $k_{LAP}$ as specified above, normalized by a factor $2^{(2(k-1))}$.

Then, for j=1, . . . , $T_k$:
In block 143, the routine 125 calculates the gradient:

$$G_A = \Delta_k l_{j-1},$$

$$G = G_A + \alpha(l_{j-1} - s_k) - \beta(G_A - G_B)$$

In block 145, the routine 125 calculates $\mu_{NSD}$:

$$\mu_A = <G, G>,$$

$$\mu_B = -<G, \Delta_K G>,$$

$$\mu_{NSD} = \mu_A | (\alpha \mu_A + (1+\beta) \mu_B)$$

Where:

$$\langle G, F \rangle = \sum_{n=1}^{N} \sum_{m=1}^{M} G[n, m] F[n, m]$$

In block 147, the routine 125 completes the NSD iteration:

$$l_j = l_{j-1} - \mu_{NSD} \cdot G,$$

In block 149, the result is projected onto the constraints:

$$l_j = \max\{l_j, s_k\},$$

The loop processing solves the intermediate problem:

Minimize:

$$F_k[l] = \int_{\Omega_k} (|\nabla l|^2 + \alpha(l - s_k)^2 + \beta|\nabla(l - s_k)|^2) dx dy$$

Subject to: $1 \geq s_k$ and $<\nabla l, \vec{n}> = 0$ on $\partial\Omega$

Returning to FIG. 4, in block 127, if k>1, the result $l_{Tk}$ is up scaled (2:1 ratio) by pixel replication into the new $l_0$, the initialization for the next resolution k–1 layer. The resolution layer is updated k=k–1, and the algorithm proceeds by going again to block 125. If k=1, the result $l_{T1}$, is the final output of the algorithm 120.

By setting the parameters $\alpha=\beta=0$, and removing the constraint $1 \geq s$, the algorithm 120 reduces to the Homomorphic filtering process that was shown to be equivalent to the basic formulation of the random walk algorithms.

Using the method and the system described above, the solution to Equation (1), and the convergence of the numerical algorithm 120 can be shown to be unique. That is, the variational optimization problem P, given by Minimize:

$$F_k[l] = \int_{\Omega_k} (|\nabla l|^2 + \alpha(l - s_k)^2 + \beta|\nabla(l - s_k)|^2) dx dy$$

Subject to: $1 \geq s_k$ and $<\nabla l, \vec{n}> = 0$ on $\partial\Omega$ with $\alpha \geq 0$ and, $\beta \geq 0$, has a unique solution.

The algorithm 120 has thus far been described with respect to a single channel. In another embodiment, the system and the method are applied to color images. When processing color images, one option is to deal with each color channel separately. Such channel-by-channel processing may be referred to as 'RGB Retinex' processing. Treating the R, G, and B channels separately usually yields a color correction effect. For example, applying RGB Retinex processing to a reddish image should modify the illumination in such a way that the red hue is removed and the resulting image is brightened and corrected. Therefore, for some image types, RGB Retinex processing improves the colors. For other image types, such color correction may cause color artifacts that exaggerate color shifts, or reduce color saturation.

In yet another embodiment, colors are mapped into a luminance/chrominance color space, such as HSV. Next, the Retinex correction is applied, but only to the luminance or V layer, and then the colors are mapped back to the RGB domain. This method may be referred to as 'HSV Retinex'. Color shifts in such cases are less-likely. The advantage of HSV Retinex processing is that only a single channel is processed. However, using this embodiment colors are not corrected with respect to hue (H), and saturation ($\bar{S}$).

The reflectance image R obtained by the Retinex process is sometimes an over-enhanced image. This can be explained by the facts that i) the human visual system usually prefers illumination in the image, and that ii) removal of all the illumination exposes noise that might exist in darker regions of the original image.

Figure 7:
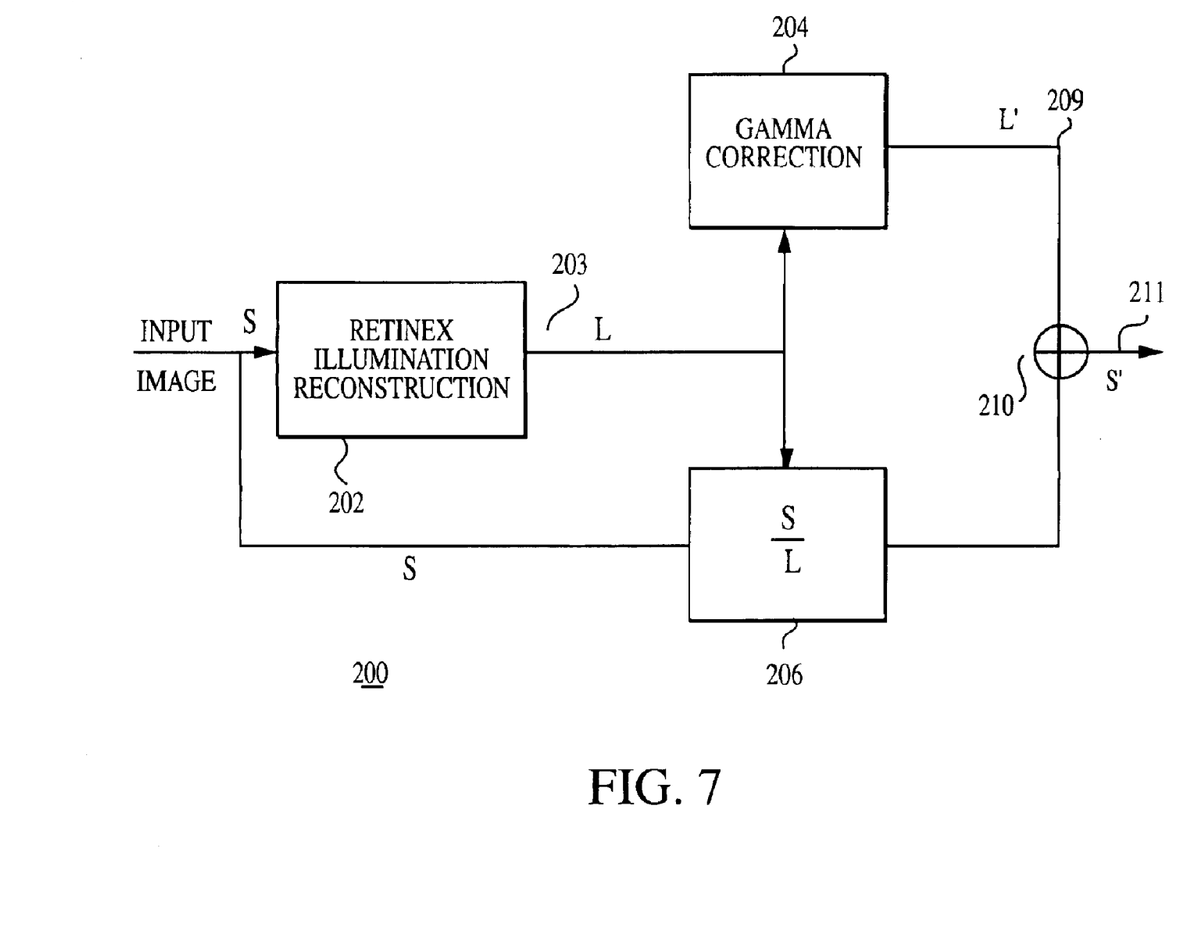
FIG. 7 is a block diagram of an alternate improved algorithm.

In still another embodiment, a corrected version of the reconstructed illumination is added back to the constructed reflectance image. FIG. 7 describes this operation. In FIG. 7, an algorithm 200 computes the illumination image L=exp(l) from the intensity image S=exp(s), and the reflectance image R=S/L. This is shown where an input image S 201 is applied to a Retinex module 202 to produce an illumination image L 203. The illumination image L 203 is tuned by a Gamma correction operation 204 with a free parameter γ, to obtain a new illumination image L' 209. A reflectance module 206 computes reflectance R 207 from the input image S 201 and the illumination image L 203. The new illumination image L' 209 is multiplied by the reflectance R 207 at 210 to produce an output image S' 211, where S'=L'R. The Gamma correction is performed by $$L' = W \cdot \left[\frac{L}{W}\right]^{\frac{1}{\gamma}},$$

where W is the white value (equal to 255 in 8-bit images).

The final result S' is given, therefore, by:

$$S' = L' \cdot R = \frac{L'}{L}S$$
$$= W\frac{(L/W)}{L}S = \frac{S}{(L/W^{1-1/\gamma})}$$

For γ=1, the whole illumination is added back, and therefore S'=S. For γ=∞, no illumination is returned, and S'=R W, which is the same reflectance image, R, as obtained by the algorithm 100, stretched to the interval [0, W]. This later case can also be considered as multiplying a maximum constant illumination W to the reflectance image R.

An analog to adding the illumination to the final image can be found in the homomorphic filtering approach. A linear filter for the illumination calculation in the log domain removes high-pass spatial components of s, yet also attenuates the low-pass components by a factor of $\gamma_1$ (where i stands for illumination). This is an analog to a gamma correction of the illumination with $\gamma = \gamma_i$, since the equation for S' can be written in the form:

$$\frac{S'}{W} = \left(\frac{L}{W}\right)^{1/\gamma} \cdot R,$$

and therefore:

$$s' - w = \frac{1}{\gamma}(l - w) + r$$
$$= \frac{1}{\gamma}(\text{low-pass components}) + (\text{high-pass components}).$$

In an ideal environment, the illumination L is assumed to be piece-wise smooth. That is, L is smooth everywhere except at strong discontinuities of the input image S. This ideal can be approached in a number of ways. First, referring again to FIG. (1), both the illumination L and the reflectance R are required to be smooth. However, these requirements contradict each other because l plus r must equal s. Thus l and r share the discontinuities. The parameter β arbitrates this contradiction and makes sure that appropriate parts of each discontinuity are apportioned to l and r.

A second approach ensures that the illumination l smoothness requirement be valid everywhere except over discontinuities of s, and that the reflectance smoothness be valid over discontinuities of s.

This second approach requires computing a weight function w(∇s) that obtains values close to 1 over most parts of the image s, and close to 0 over strong discontinuities. Equation (1) then becomes:

$$F[l] = \int_\Omega (w(\nabla s)|\nabla l|^2 + \alpha|l - s|^2) + \qquad (3)$$
$$\beta(l - w(\nabla s))|\nabla(l - s)|^2)dxdy$$

The projected steepest descent solution to Equation (3) composed of a series of gradient steps is:

$$l_{i+1} = l_i + \mu[D_x^f(w(\nabla s)D_x^b(l_i)) + D_y^f(w(\nabla s)D_y^b(l_i)) - \alpha(l_i - s) +$$
$$\beta \cdot D_x^f((1 - w(\nabla s))D_x^b(l_i - s)) + \beta \cdot D_y^f((1 - w(\nabla s))D_y^b(l_i - s))]$$

and projections:

$l_i$=max{$l_i$, s}

Where:
μ is a constant
$D_x^f$ (.) is a forward derivative in the x-direction.
$D_x^b$ (.) is a backward derivative in the x-direction.
$D_y^f$ (.) is a forward derivative in the y-direction.
$D_y^b$ (.) is a backward derivative in the y-direction.

Figure 8:
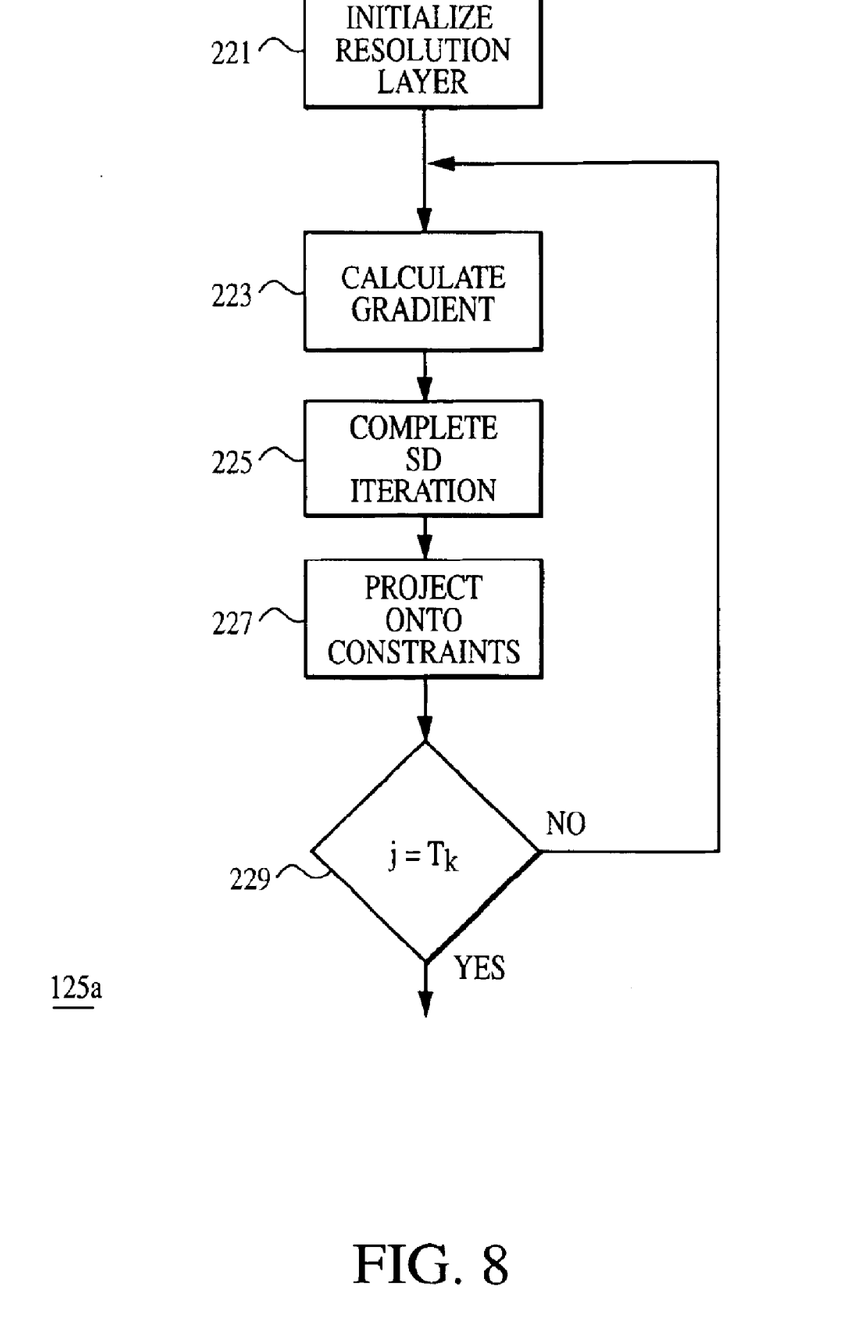
FIG. 8 is a block diagram of yet another alternate improved algorithm.

FIG. 8 illustrates an algorithm 125a, which is an alternative to the algorithm 125 in algorithm 120, that may be used to solve the functional (Equation (3)).

In block 221, the algorithm 125a calculates w(∇s), $\alpha_k$ and $T_k$:

$$w(\nabla s_k) = \frac{1}{\left(1 + \frac{|\nabla s_k|^2}{Th}\right)^6}$$

where Th is a constant threshold, $\alpha_k = \alpha_0 \cdot 2^{2k}$ and $T_k = T_0 \cdot 2^{k+1}$ Note that $\alpha_k$ changes for each resolution level-a higher $\alpha_k$ corresponds to a course resolution level.

In block 223, the algorithm 125a calculates:

G=$D_x^f$(w(∇s)$^b D_x(l_i)$)+$D_y^f$(w(∇s)$D_y^b(l_i)$)−α($l_i$−s)+β$D_x^f$((l−w(∇s))$D_x^b(l_i$−s))+β$D_y^f$((l−w(∇s))$D_y^b(l_i$−s))

In block 225, the algorithm 125a completes the SD iteration:

$l_{i+1}=l_i+\mu \cdot G$

In block 227, the result is projected into the constraints $l_i$=max {$l_i$, $s_k$}.

In block 229, the algorithm 125a checks if i=$T_k$, and if so, processing according to the algorithm 220 ends.

What is claimed is:

1. An image enhancement method, comprising:

capturing an image;

constructing a multi-resolution structure comprising one or more resolution layers;

processing each resolution layer using an iterative algorithm having at least one iteration;

calculating a gradient of a penalty functional, where the penalty functional includes a weight function that obtains values close to the logarithm of the illumination of the image over most parts of the logarithm of the image;

projecting each processed resolution layer to a subsequent resolution layer;

up-calling each projected resolution layer to the subsequent resolution layer; and using the projected resolution layers to estimate an illumination image.

2. The method of claim 1, further comprising, for each of one or more iterations:

computing an optimal line-search step size.

3. The method of claim 1, wherein the penalty functional is given by:

$$F[l] = \int_\Omega w_1(\nabla s)|\nabla l|^2 + \alpha(l-s) + \beta w_2(\nabla s)|\nabla l - \nabla s|^2 \, dx dy$$

where $w_1$ and $w_2$ are non-linear functions of the gradient.

4. The method of claim 1, wherein the iterative algorithm is a Projected Normalized Steepest Descent algorithm.

5. The method of claim 1, wherein the iterative algorithm is a Steepest Descent algorithm.

6. The method of claim 1, wherein a set of constraints comprises a constraint that the illumination is greater than the image intensity, L>S.

7. The method of claim 1, further comprising applying penalty terms, the penalty terms comprising:

that the illumination is spatially smooth;

that the reflectance is maximized; and that the reflectance is piece-wise smooth.

8. The method of claim 1, further comprising:

computing the reflectance image based on the captured image and the estimated illumination image;

computing a gamma correction factor;

applying the gamma correction factor to the estimated illumination image;

and multiplying the gamma-corrected illumination image and the reflectance image, thereby producing a corrected image.

9. A system, embodied in computer-readable medium, for enhancing digital images, comprising:

a log module that receives an input digital image S and computes a logarithm s of the input digital image;

an illumination estimator module that produces an estimate l* of an illumination component L of the input digital image S, wherein the estimator module employs a construct comprising one or m or e resolution layers, and an iterative algorithm that processes each of the one or more resolution layers, wherein the iterative algorithm, for each of one or more iterations, calculates a gradient of a penalty functional, wherein the penalty functional includes weight functions $w_1$ and $w_2$ applied to $\nabla_s$ that obtain values close to the logarithm of L except over discontinuities of the logarithm s; and a summing node that sums the logarithm s and a negative of the estimate l* to produce an estimate r* of a logarithm of a reflectance component R of the input digital image S, wherein a processed resolution layer is used to up-scale a subsequent resolution layer.

10. The system of claim 9, wherein the iterative algorithm, for each of one or more iterations:

computes an optimal line-search step size.

11. The system of claim 9, wherein the penalty functional is given by:

$$F[l] = \int_\Omega w_1(\nabla s)|\nabla l|^2 + \alpha(l-s) + \beta w_2(\nabla s)|\nabla l - \nabla s|^2 \, dx dy$$

where $w_1$ and $w_2$ are non-linear functions of the gradient.

12. The system of claim 9, wherein the iterative algorithm is a Projected Normalized Steepest Descent algorithm.

13. The system of claim 9, wherein the iterative algorithm is a Steepest Descent algorithm.

14. The system of claim 9, wherein each of the one or more resolution layers is projected onto constraints, and wherein the constraints comprise that the illumination is greater than the image intensity, L>S.

15. The system of claim 9, further comprising applying penalty terms, the penalty terms comprising:

that the illumination is spatially smooth;

that the reflectance is maximized; and that the reflectance is piece-wise smooth.

16. The system of claim 9, further comprising:

a module that computes reflectance and illumination images based on the input digital image and the estimate illumination image;

a gamma correction module that computes a gamma correction factor and applies the gamma correction factor to the estimated illumination image; and a node that multiplies the gamma-corrected illumination image and the reflectance image, thereby producing a corrected digital image.

17. A method for enhancing an image S, the image S comprising a reflectance R and an illumination L, the method comprising:

constructing a multi-resolution image structure having one or more resolution layers;

processing the resolution layers using an iterative algorithm, wherein the iterative algorithm, for each of one or more iterations, calculates a gradient of a penalty functional, wherein the penalty functional includes a weight function that obtains values close to the logarithm of L except over discontinuities of the logarithm of the image S;

projecting the processed resolution layers onto a set o constraints, the set of constraints comprising boundary conditions and that L>S; and using the projected resolution layers to estimate an illumination image.

18. The method of claim 17, wherein the image S is a RGB domain color image, the method further comprising:
   mapping colors R, G, B of the image S into a luminance/chrominance color space;
   applying a correction factor to a luminance layer; and
   mapping the luminance/chrominance colors back to e RGB domain.

19. The method of claim 17, wherein the penalty functional is given by:

$$F[l] = \int_\Omega w_1(\nabla s)|\nabla l|^2 + \alpha(l-s) + \beta w_2(\nabla s)|\nabla l - \nabla s|^2 \, dxdy$$

where $w_1$ and $w_2$ are non-linear functions of the gradient.

* * * * *